(12) United States Patent
Ogawa

(10) Patent No.: US 7,760,241 B2
(45) Date of Patent: Jul. 20, 2010

(54) IMAGE CAPTURING APPARATUS

(75) Inventor: Shigeo Ogawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 674 days.

(21) Appl. No.: 11/395,548

(22) Filed: Mar. 31, 2006

(65) Prior Publication Data

US 2006/0221204 A1  Oct. 5, 2006

(30) Foreign Application Priority Data

Apr. 4, 2005  (JP) .............. 2005-107746

(51) Int. Cl.
  H04N 5/225 (2006.01)
  H04N 5/235 (2006.01)
  H04N 9/73 (2006.01)
(52) U.S. Cl. .............. 348/220.1; 348/221.1; 348/222.1; 348/223.1; 348/229.1; 348/362
(58) Field of Classification Search ... 348/231.2–231.9, 348/362, 231.99, 221.1, 220.1–223.1, 225.1, 348/229.1, 207.99
See application file for complete search history.

(56) References Cited

U.S. PATENT DOCUMENTS

| | | | |
|---|---|---|---|
| 6,028,981 A * | 2/2000 | Hirasawa et al. ............ | 386/117 |
| 6,727,949 B1 * | 4/2004 | Saruwatari et al. .......... | 348/349 |
| 7,110,025 B1 * | 9/2006 | Loui et al. ............... | 348/220.1 |
| 7,633,530 B2 * | 12/2009 | Ogawa .................... | 348/220.1 |
| 2002/0001035 A1 * | 1/2002 | Haneda ...................... | 348/220 |
| 2002/0196348 A1 * | 12/2002 | Kubo ...................... | 348/220.1 |
| 2003/0095191 A1 * | 5/2003 | Saito ....................... | 348/220.1 |
| 2003/0112340 A1 * | 6/2003 | Okada et al. ............. | 348/220.1 |
| 2004/0109067 A1 * | 6/2004 | Yokoi ...................... | 348/220.1 |
| 2004/0189823 A1 * | 9/2004 | Shibutani ................. | 348/231.1 |
| 2004/0246344 A1 * | 12/2004 | Voss et al. ............... | 348/220.1 |
| 2006/0055816 A1 * | 3/2006 | Won et al. ................... | 348/362 |

FOREIGN PATENT DOCUMENTS

| | | |
|---|---|---|
| JP | 2001-69409 A | 3/2001 |
| JP | 2003-061113 | 2/2003 |
| JP | 2003061113 * | 2/2003 |
| JP | 2003-219341 | 7/2003 |
| JP | 2003219341 * | 7/2003 |
| JP | 2004-158967 | 6/2004 |
| JP | 2004-186866 | 7/2004 |

(Continued)

OTHER PUBLICATIONS

Office Action dated Sep. 3, 2007, concerning the basic Japanese Patent Application No. 2005-107746.

Primary Examiner—Jason Chan
Assistant Examiner—Michael Osinski
(74) Attorney, Agent, or Firm—Canon U.S.A., Inc. I.P. Division

(57) ABSTRACT

An image capturing apparatus capable of shooting still images during moving image shooting generates an alternate frame image corresponding to a moving image frame dropped when acquiring a still image when performing still image shooting during moving image shooting, using the obtained still image. At this point, white balance control values are respectively set for the still image and the alternate frame image. The still image and the alternate frame image are developed using the set white balance control values.

15 Claims, 10 Drawing Sheets

FOREIGN PATENT DOCUMENTS

| | | |
|---|---|---|
| JP | 2004-201282 A | 7/2004 |
| JP | 2004-207805 | 7/2004 |
| JP | 2004-247888 | 9/2004 |
| JP | 2004-328460 | 11/2004 |
| JP | 2004328460 | * 11/2004 |

* cited by examiner

FIG. 7

| | TRACK LIGHT SOURCE (○:YES  ×:NO) | |
|---|---|---|
| | ALTERNATE FRAME IMAGE | STILL IMAGE DURING MOVING IMAGE SHOOTING |
| COLOR REPRODUCIBILITY PRIORITY MODE (PROCESSING IS ALWAYS PERFORMED TO ACHIEVE COLOR REPRODUCIBILITY) | ○ | ○ |
| MOVING IMAGE PRIORITY MODE (PROCESSING THAT PRIORITIZES COLOR OF MOVING IMAGE) | × (REFERENCES LAST MOVING IMAGE) | × (REFERENCES ALTERNATE FRAME IMAGE) |
| STILL IMAGE PRIORITY MODE (PROCESSING THAT PRIORITIZES COLOR OF STILL IMAGES DURING MOVING IMAGE SHOOTING) | × (REFERENCES LAST MOVING IMAGE) | ○ |

IMAGE CAPTURING APPARATUS

FIELD OF THE INVENTION

The present invention relates to an image capturing apparatus that generates digital image data from image signals obtained through photoelectric conversion performed by an imaging device on an optical image of a subject captured through a photographic lens.

BACKGROUND OF THE INVENTION

In typical digital cameras, white balance (hereinafter may be transcribed as WB) control is performed based on a light source type determined from a spectrum distribution obtained by analyzing reflected light thrown back from a subject. In other words, digital cameras vary white balance control values depending on light source types determined to achieve color reproduction independent from light source color. Since the balance of signal levels outputted from imaging devices such as CCDs vary according to drive methods, compensation is performed depending on spectral sensitivity during the analysis of reflected light. For instance, known CCD drive methods include field readout and frame readout. Field readout is a drive method that adds and reads out each two pixels in a vertical direction of the CCD, and is typically used for shooting moving images. On the other hand, frame readout is a method that reads out each pixel in a vertical direction of the CCD without adding each two pixels, and is typically used for shooting still images.

In addition, digital video cameras capable of shooting still images at a desired time during moving image shooting are known. A technique for reducing and preventing variances in the color reproducibility of images attributable to the differences in the CCD drive methods when shooting still images during shooting of moving images with digital video cameras of this type is disclosed in Japanese Patent Laid-Open No. 2001-069409. According to Japanese Patent Laid-Open No. 2001-069409, a sensitivity difference between the CCDs of such driving methods is memorized in advance in order to absorb the difference in sensitivities of CCDs due to differences in drive methods. Using a signal obtained by the drive method for moving image shooting, and the memorized sensitivity difference, an aperture to be applied to the drive method for still image shooting is determined. According to Japanese Patent Laid-Open No. 2001-069409, white balance coefficients are appropriately set in response to switching of driving methods.

Furthermore, Japanese Patent Laid-Open No. 2004-201282 describes a control for a digital camera that temporarily suspends driving of the CCD for moving image shooting, switches to driving for still image shooting to shoot a still image, and thereafter returns to driving for moving image shooting in order to shoot still images while shooting moving images. Japanese Patent Laid-Open No. 2004-201282 further describes generating an alternate frame corresponding to a moving image frame that is dropped due to shooting still images during moving image shooting.

Typically, as described above, when shooting still images during shooting moving images with digital video cameras, CCD drive modes differ between moving image shooting and still image shooting. Since such variations in drive modes result in variation in CCD spectral sensitivities, it is necessary to change development processing parameters according to drive mode. For instance, processing such as switching white balance coefficients depending on drive modes is necessary. However, Japanese Patent Laid-Open No. 2004-201282 does not consider varying development processing depending on drive modes. In Japanese Patent Laid-Open No. 2004-201282, since the last frame taken in moving image shooting-mode immediately prior to shooting still images is used as an alternate frame, continuity of image color is maintained through moving image shooting. However, since still images are also developed using parameters for moving images, the difference in spectral sensitivities of still images taken during moving image shooting cannot be compensated. Therefore, it is possible that the resulting still images are not totally satisfactory. Also, while Japanese Patent Laid-Open No. 2001-069409 describes changing parameters for development processing when shooting still images during moving image shooting, alternate frames are not mentioned.

Moreover, in Japanese Patent Laid-Open No. 2004-201282, the use of the moving image frame immediately prior to the shooting of a still image means that the motion of the moving image is stopped, and may result in apparent unnaturalness. Therefore, reduction of the still image may be considered as a method for generating alternate frames. This method improves the unnaturalness of the motion in the moving images, as compared to using the moving image frame immediately prior to the shooting of the still image. Consequently, it is possible to consider applying Japanese Patent Laid-Open No. 2004-201282 to a configuration that generates alternate frames by reducing still images. However, in this case, CCD frame readout is performed upon shooting still images during moving image shooting. When reducing still images obtained in this way and using them as alternate frames, since moving image shooting is performed by reading out single fields, a problem arises where color continuity is not maintained between the period of shooting still images during moving image shooting, and the periods before and after that period.

As seen, conventional digital video cameras are incapable of giving satisfactory color to both still images obtained by still image shooting during moving image shooting, and alternate frames to be inserted in the moving image during such still image shooting.

SUMMARY OF THE INVENTION

The prevent invention was made in light of the above problems, and its object is to enable appropriate image processing on both moving images and still images while shooting still images during moving image shooting.

In order to solve the above problems, an image capturing apparatus according to an aspect of the present invention is configured as follows.

An image capturing apparatus capable of shooting still images during moving image shooting, comprising:

still image shooting unit adapted to perform still image shooting during moving image shooting to obtain a still image;

generating unit adapted to generate an alternate image corresponding to a moving image upon still image shooting performed by the still image shooting unit adapted to use the still image;

setting unit adapted to set respective white balance control values for the still image and the alternate image; and image processing unit adapted to perform image processing on the still image and the alternate image using white balance control values set by the setting unit.

An image capturing apparatus according to another aspect of the present invention is configured as follows.

An image capturing apparatus capable of shooting still images during moving image shooting, comprising:

still image shooting unit adapted to perform still image shooting during moving image shooting to obtain a still image;

generating unit adapted to generate an alternate image corresponding to a moving image upon still image shooting performed by the still image shooting unit adapted to use the still image; and image processing unit adapted to perform image processing on the still image and the alternate image using parameters tracking light source conditions during the still image shooting.

An image capturing apparatus according to yet another aspect of the present invention is configured as follows.

An image capturing apparatus capable of shooting still images during moving image shooting, comprising:

still image shooting unit adapted to perform still image shooting during moving image shooting to obtain a still image;

generating unit adapted to generate an alternate frame image corresponding to the moving frame image during the shooting of still images by the still image shooting unit adapted to use the still image; and image processing unit adapted to perform image processing on the still image using parameters tracking light source conditions during the still image shooting, and image processing the alternate image using parameters with restrictions on tracking light source conditions during the still image shooting.

The present invention also provides a control method for the above image capture apparatuses.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a diagram showing a list of settings of white balance processing for still image shooting during moving image shooting by the image capturing apparatus according to the present embodiment;

DETAILED DESCRIPTION OF THE PREFERRED EMBODIMENT

Figure 1:
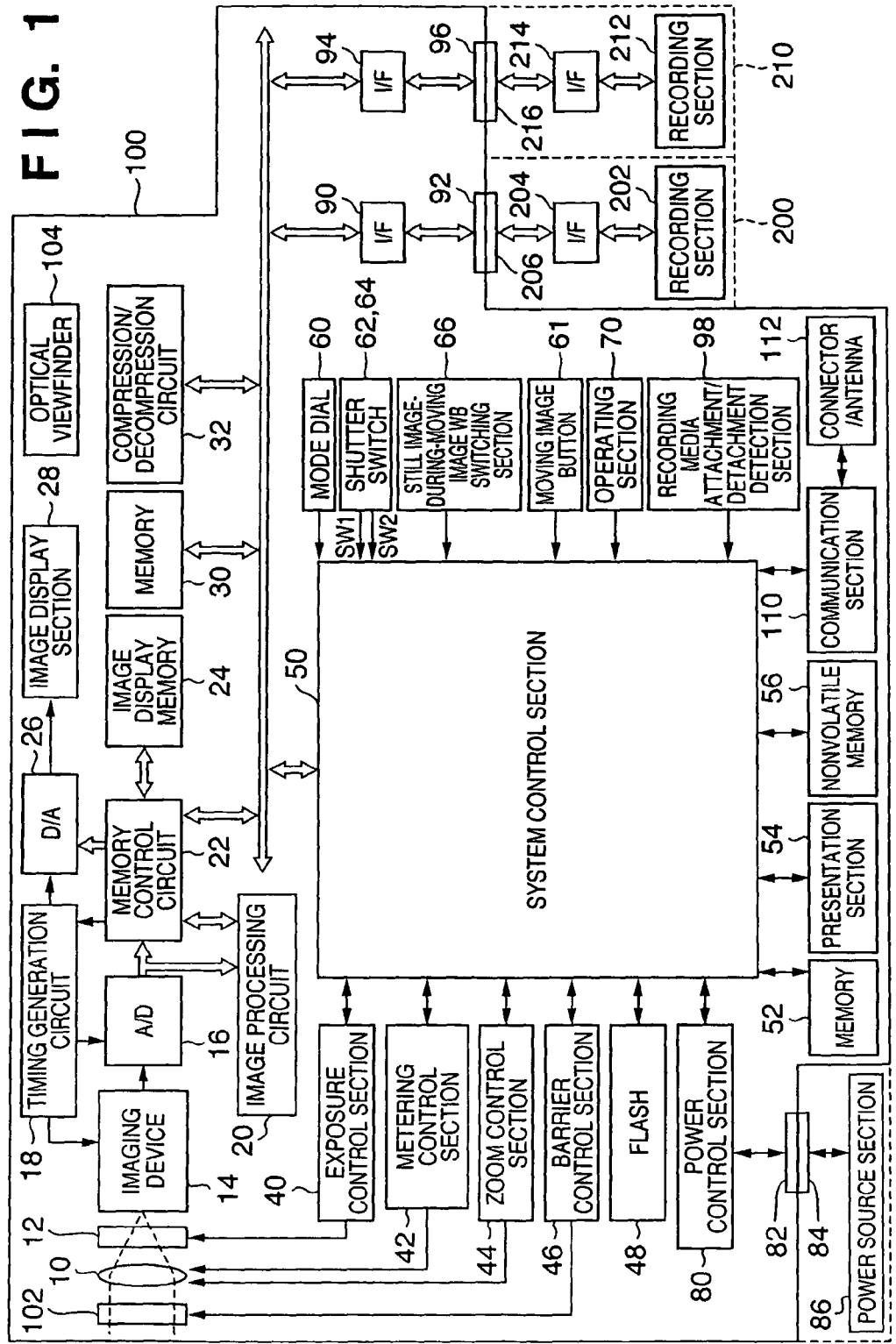
FIG. 1 is a block diagram showing a configuration of an image capturing apparatus according to a present embodiment.

A preferred embodiment of the present invention will now be described by referring to the drawings attached hereto.

FIG. 1 is a block diagram showing a configuration of an image capturing apparatus (digital video camera) 100 according to the present embodiment. Optical images travel through a photographic lens 10 and a shutter 12 with an aperture function, and form on an imaging device 14. The imaging device 14 converts optical images to electric signals, and outputs analog signals. Known elements such as CCDs and CMOS sensors may be used as the imaging device 14. An A/D converter 16 converts analog signals outputted by the imaging device 14 into digital data.

A timing generation circuit 18 is controlled by a memory control circuit 22 and a system control section 50, and provides clock signals and control signals to the imaging device 14, the A/D converter 16 and a D/A converter 26. An image processing circuit 20 performs predetermined pixel interpolation processing and color conversion processing on digital data from the A/D converter 16 or data from the memory control circuit 22. The image processing circuit 20 also performs predetermined computations using captured image data, and provides the system control section 50 with the results thereof. Based on the obtained computation results, the system control section 50 exerts control over an exposure control section 40 and a metering control section 42, and performs processing of AF (auto focus), AE (automatic exposure), and EF (flash pre-firing) by a TTL (through-the-lens) method. The image processing circuit 20 further performs predetermined computations using the captured image data, and based on the obtained computation results, performs TTL-based AWB (auto white balance) processing.

The memory control circuit 22 controls the A/D converter 16, the timing generation circuit 18 and the image processing circuit 20, as well as an image display memory 24, the D/A converter 26, a memory 30 and a compression/decompression circuit 32. Digital data from the A/D converter 16 is written into the image display memory 24 or the memory 30 as image data either via the image processing circuit 20 and the memory control circuit 22, or directly via the memory control circuit 22.

Image data written into the image display memory 24 is displayed by an image display section 28 via the D/A converter 26. The image display section 28 is composed of, for instance, a TFT LCD or the like. An electronic viewfinder (EVF) function can be achieved by sequentially displaying captured image data using the image display section 28. The image display section 28 can arbitrarily turn the display on and off according to instructions from the system control section 50. When display is disabled at the image display section 28, the power consumption of the image capturing apparatus 100 can be significantly reduced. Therefore, power saving may be achieved by disabling display at the image display section 28 while shooting through an optical viewfinder 104.

The memory 30 stores taken still and moving images. The memory 30 has sufficient storage capacity for storing a predetermined number of still images, and dynamic images taken over a predetermined time. It is thereby possible to perform high-speed and substantial image writing into the memory 30 when performing continuous shooting, which involves continuously shooting multiple still images, and panoramic shooting. The memory 30 may also be used by the system control section 50 as a work area.

The compression/decompression circuit 32 performs compression and decompression of image data using adaptive and discrete cosine transform (ADCT) and the like; The compression/decompression circuit 32 reads images stored in the memory 30 to perform compression processing or decompression processing, and writes the processed data into the memory 30.

The exposure control section 40 controls the aperture function of the shutter 12, and achieves a flash dimmer function by working in cooperation with a flash 48. The metering control section 42 controls focusing of the photographic lens 10. A zoom control section 44 controls zooming of the photographic lens 10. A barrier control section 46 controls operation of a protective member 102, which is a barrier. Reference numeral 48 denotes a flash that possesses a floodlight function of an AF auxiliary light and a flash dimmer function in addition to normal flash functions. The system control section 50 controls the exposure control section 40 and the metering control section 42 based on the computation results on the captured image data performed by the image processing circuit 20. Thus, both the exposure control section 40 and the metering control section 42 are controlled using the TTL method.

The system control section 50 controls the entire image capturing apparatus 100. A memory 52 stores constants, variables and programs for the operation of the system control section 50. The memory 52 also stores program diagrams used by AE. Incidentally, program diagrams are tables defining the relationship between the control values of aperture radius and shutter speed, and exposure value.

A presentation section 54 presents user with operational statuses or messages according to the execution of programs by the system control section 50 using characters, images, voice and the like. The presentation section 54 is composed of a combination of a liquid crystal display (LCD) for displaying various information, LEDs or speakers (sounding elements). Presentation sections 54 are placed at a single or multiple locations near an operating section of the image capturing apparatus 100 and thereby easily viewable from the user. Some functions of the presentation section 54 are located inside an optical viewfinder 104. Examples of contents to be displayed on the LCD or the like of the presentation section 54 include single shot/continuous shooting, self-timer, compression ratio, number of recording pixels, number of recorded images, number of recordable images, shutter speed, aperture value, exposure compensation, flash, red-eye reduction, macro shooting, buzzer setting, remaining clock battery, remaining battery, error, multi-digit number information, attachment/detachment status of a recording media 200 and 210, communication I/F operation, date/time display and the like. Some of the contents to be displayed by the presentation section 54 are displayed within the optical viewfinder 104. These include focusing, camera shake alert, flash, shutter speed, aperture value and exposure compensation display and the like.

A nonvolatile memory 56 is an electrically erasable and recordable memory, and may be composed, for instance, of an EEPROM.

Reference numerals 60, 61, 62, 64, 66 and 70 configure user interfaces for inputting various operational instructions to the system control section 50. The operating section is composed of a single or a plurality of combinations of a switch or dial, a touch panel, pointing by line-of-sight detection, a speech recognition device or the like. A mode dial 60 is a switch capable of switching and setting various functional modes including power-off, automatic shooting mode, moving image shooting mode, still image shooting mode, panoramic shooting mode, playback mode, multi-screen playback/erasing mode and PC connection mode. A moving image button 61 is a button used for providing instructions to start and finish moving image shooting. Moving image shooting is initiated by pressing the moving image button 61 when moving image shooting is not in progress. Moving image shooting is terminated when pressing the moving image button 61 during moving image shooting.

Reference numeral 62 denotes a shutter switch (SW1), which is activated in the middle of the operation of a shutter button not shown. When the shutter switch 62 comes on, the system control section 50 commences operations such as the processing of AF (auto-focus), AE (automatic exposure), AWB (auto white balance), EF (flash pre-firing) and so on.

Reference numeral 64 denotes a shutter switch (SW2), which comes on when the operation of the shutter button not shown is concluded. When the shutter switch 64 comes on, the system control section 50 performs the operations of a series of shooting-related operations, that is, exposure, development and recording. In exposure processing, a signal read from the imaging device 14 is written into the memory 30 as digital data via the A/D converter 16 and the memory control circuit 22. For development processing, the image processing circuit 20 and the memory control circuit 22 perform computations on the digital data. The obtained digital image data is written into the memory 30. For recording processing, image data read from the memory 30 is compressed by the compression/decompression circuit 32, and then written into storage media 200 or 210.

Still image-during-moving image WB switching section 66 provides a user interface for setting WB operation when shooting still images during shooting moving images. In the present embodiment, a mode may be selected from three modes: color reproducibility priority, moving image priority, and still image priority.

The operating section 70 consists of various buttons, a touch panel, and the like. Components may include a menu button, a set button, a macro button, a multi-screen playback page feed button, a flash setting button, a single/continuous/self-timer switch button, a menu forward button, a menu backward button, a playback image forward button, a playback image backward button, a shooting image quality selection button, an exposure compensation button and a date/time setting button.

A power control section 80 is composed of a battery detection circuit, a DC-DC converter, a switch device for switching blocks to be energized, and the like. This configuration allows the power control section 80 to detect whether or not the battery is mounted, the battery type and remaining battery charge, and control the DC-DC converter based on detection results and instructions from the system control section 50 to supply a necessary voltage over a necessary period to the various sections including the recording medium.

The power control section 80 is connected to a power source section 86 via connectors 82 and 84. Batteries that may be used as the power source section 86 include primary batteries such as an alkaline battery or a lithium battery, secondary batteries such as a BNiCd battery, an NiMH battery or an lithium ion battery, and an AC adapter or the like.

Interfaces 90 and 94 connect recording media such as a memory card and a hard disk with an internal bus. Connectors 92 and 96 are used to connect recording media such as the memory card and the hard disk. A recording media detecting section 98 detects whether or not recording media is respectively mounted on the connectors 92 and 96.

The present embodiment is described as having two systems of interfaces and connectors for attaching recording media. It is apparent that there may be either a single or an arbitrary number of a plurality of systems of interfaces and connectors for attaching recording media. The present embodiment may also be configured with a combination of interfaces and connectors of different standards. The interfaces and connectors may be those in compliance with various recording media standards such as a PCMCIA card or a CF (CompactFlash®) card.

Furthermore, by mounting communication cards onto the connectors 92 and 96, mutual transferring of image data and management information attached thereto with other computers or peripherals such as a printer can be achieved. Interfaces and connectors in compliance with various recording media standards such as PCMCIA cards or CF (CompactFlash®) cards may be used as the interfaces 90, 94 and connectors 92, 96 which achieve such communication. Examples of such communication cards include a LAN card, a modem card, a USB card, an IEEE 1394 card, a P1284 card, an SCSI card, a PHS and the like.

The protective member 102 is a barrier that covers an image capturing section including the photographic lens 10 of the image capturing apparatus 100 to prevent stains or damages to the image capturing section. The optical viewfinder 104 enables shooting without having to use the electronic viewfinder function of the image display section 28. As described above, parts of the functions of the presentation section 54 such as the displaying of the respective statuses of focusing, camera shake alert, flash, shutter speed, aperture value, exposure compensation and the like are installed in the optical viewfinder 104.

A communication section 110 possesses various communication functions including RS232C, USB, IEEE 1394, P1284, SCSI, modem, LAN, wireless communication and the like. A connector/antenna 112 provides connection of the image capturing apparatus 100 to other apparatuses via the communication unit 110. The connector/antenna 112 functions as a connector in a wired connection and as an antenna during wireless communication.

The recording medium 200 (210) is a memory card or a hard disk and the like. The recording medium 200 (210) comprises a recording section 202 (212) composed of a semiconductor memory or a magnetic disk and the like, an interface 204 (214) with the image capturing apparatus 100, and a connector 206 (216) to connect to the image capturing apparatus 100.

Operation of the image capturing apparatus 100 of the present embodiment, configured as described above, will now be explained in detail.

The image capturing apparatus 100 of the present embodiment is capable of shooting still images by operating the shutter switches 62 and 64 during shooting of moving images initiated by operating the moving image button 61. It is assumed that the imaging device 14 is switched to different drive modes for shooting moving images and for shooting still images. For example, the drive mode-switching method described in Japanese Patent Laid-Open No. 2001-069409 may be applied for the switching of drive modes. In other words, during shooting of still images, a predetermined substrate voltage is applied to perform frame readout at the imaging device 14. During shooting of moving images, the substrate voltage is increased from the voltage applied for frame readout, and field readout (adding and reading out each plurality of pixels (for example, two pixels) in a vertical direction) is performed.

Figure 2:
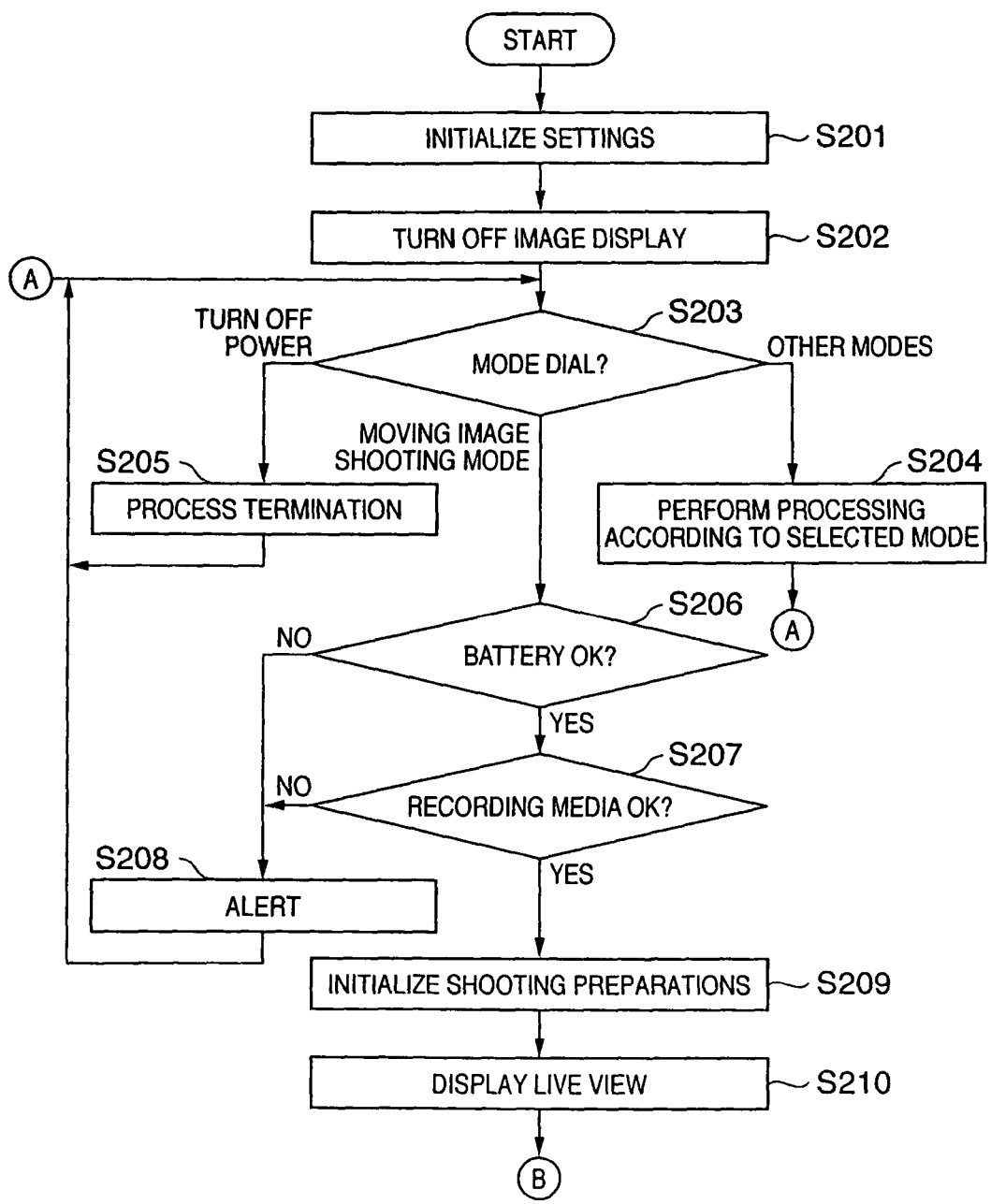
FIG. 2 is an explanatory flowchart of operation processing of a main routine of the image capturing apparatus according to the present embodiment.
Figure 3:
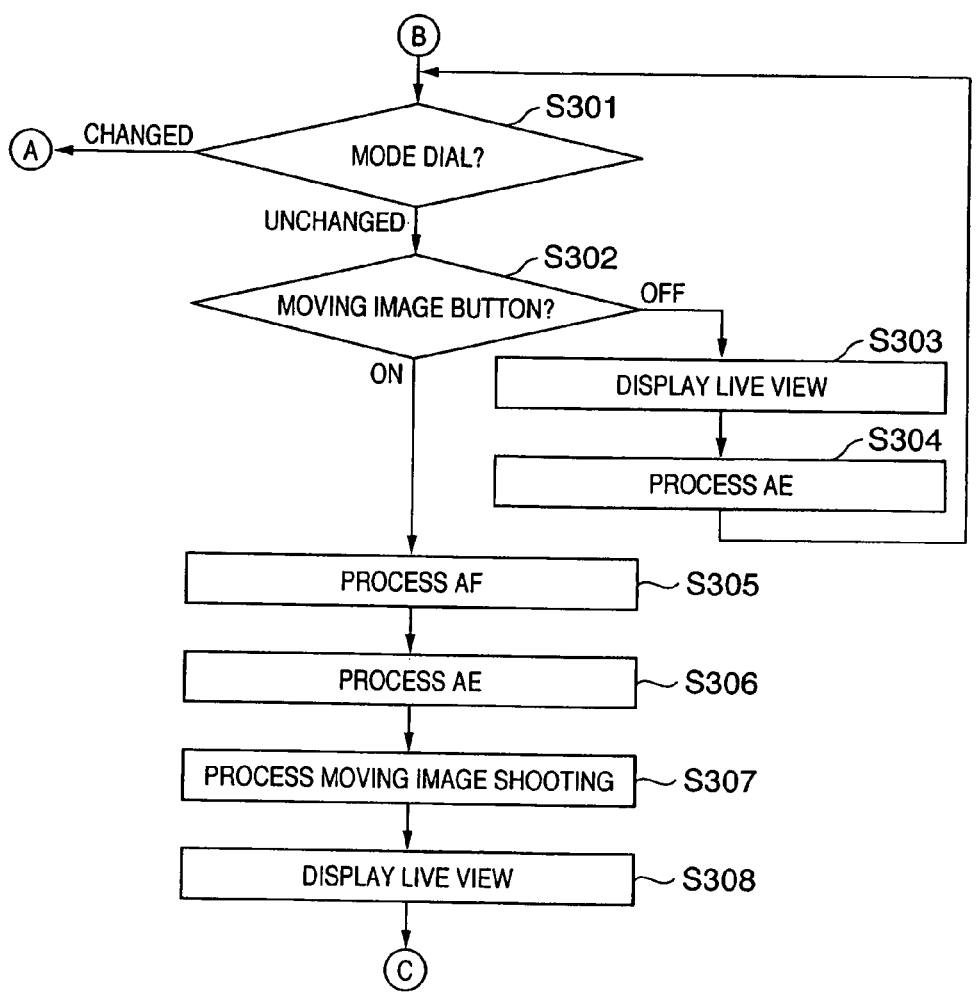
FIG. 3 is an explanatory flowchart of operation processing upon start of moving image recording by the image capturing apparatus according to the present embodiment.
Figure 4:
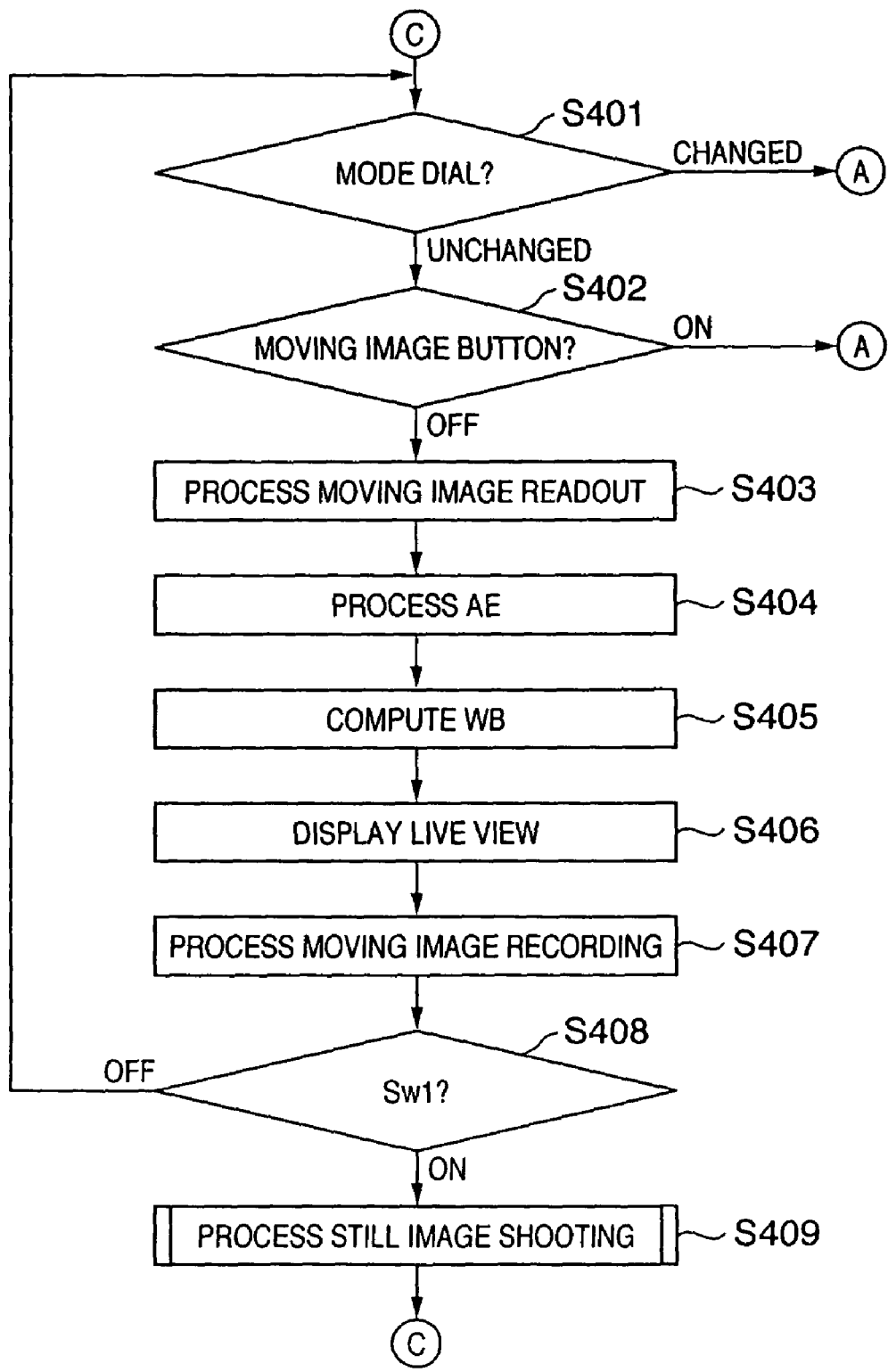
FIG. 4 is an explanatory flowchart of operation processing of moving image shooting by the image capturing apparatus according to the present embodiment.

FIGS. 2, 3 and 4 are flowcharts of a main routine of the image capturing apparatus 100 of the present embodiment. The main operations of the image capturing apparatus 100 will be described by referring to FIGS. 2, 3 and 4. Incidentally, the processing depicted in FIGS. 2, 3 and 4 are achieved by having a CPU provided in the system control section 50 execute control programs stored in the memory 52 and the like. Therefore, in the following description of the various steps, processing by the image processing circuit 20 or the exposure control section 40 is performed under instructions from the system control section 50.

The processing shown in FIG. 2 is initiated by power activation such as by replacing the battery. In step S201, the system control section 50 first initializes flags, control variables and the like. In step S202, the image display of the image display section 28 is initialized to its off state. Next, in step S203, the system control section 50 determines a setting position of the mode dial 60.

If the mode dial 60 is set to power-off, the process proceeds to step S205 to perform termination processing. Upon termination processing, the system control section 50 changes each display of the presentation section 54 to a termination state, closes the barrier of the protective member 102 to protect the image capturing section, records necessary parameters, set values and set modes including the flags and control variables into the nonvolatile memory 56, and performs processing such as cutting off unnecessary power of the various sections of the image capturing apparatus 100 including the image display section 28 by the power control unit 80. The process then returns to S203.

In step S203, if it is determined that the mode dial 60 is set to moving image shooting mode, the process proceeds to step S206. In addition, if it is determined that the mode dial 60 is set to another mode (various function modes set by the mode dial 60) in step S203, the process proceeds to step S204. In step S204, the system control section 50 performs processing according to the selected mode, and returns to step S203 upon finishing the process. Incidentally, in the present embodiment, the moving image shooting mode related to steps S206 and onward will be described in detail. Detailed description of operations of other modes will not be provided herein.

Operation of the apparatus when the mode dial 60 is set to moving image shooting mode will now be described. First, in step S206, using the power control section 80, the system control section 50 determines whether or not the remaining capacity and operating conditions of the power source 86 poses a problem for the operation of the image capturing apparatus 100. If the condition of the power source 86 poses a problem for the operation of the apparatus, the process proceeds to step S208 to present predetermined visual or audio (voice) alert messages using the presentation section 54. The process then returns to S203.

If there are no problems with the power source 86, the process proceeds to step S207 where the system control section 50 determines whether or not the conditions of the recording media 200 and/or 210 pose a problem to the operation of the image capturing apparatus 100, and in particular, to recording and playback operations of image data on the recording media. If a problem is found, the process proceeds to step S208 to present predetermined visual or audio alert (voice) messages using the presentation section 54, and then returns to step S203. If there are no problems with the operational conditions of the recording media 200 and/or 210, the process proceeds to step S209.

In step S209, the system control section 50 performs initialization as a preparation for shooting to display a live view (moving images captured by the imaging device 14 for displaying as a viewfinder function before and after the shooting of still images) on the image display section 28. Once preparation for shooting is completed, displaying of a live view by the image display section 28 commences in step S210. In a live view displaying state, data sequentially written into the image display memory 24 via the imaging device 14, the A/D converter 16, the image processing circuit 20 and the memory control circuit 22 is sequentially displayed by the image display section 28 via the memory control circuit 22 and the D/A converter 26. Thus, an electronic viewfinder function is achieved through live view display.

Camera operation upon shooting moving images during a live view displaying state will now be described with reference to the flowcharts shown in FIGS. 3 and 4.

In step S301, the process determines whether or not modes have been changed (from a moving image shooting mode setting to another mode setting) at the mode dial 60. If a mode change has occurred, the process returns to step S203 to check the status of the mode dial 60. If the mode is unchanged, the process proceeds to step S302.

In step S302, the process determines whether or not the moving image button 61 has been pressed. If not, the process proceeds to step S303 to continue displaying the live view. In step S304, the system control section 50 instructs the image processing circuit 20 to perform a predetermined light metering computation on the signal obtained from the imaging device 14, and stores the computation results in the memory 30. Based on the computation results, the system control section 50 performs AE processing on the live view using the exposure control section 40. The process then returns to step S301.

On the other hand, if it is determined in step S302 that the moving image button 61 has been pressed, processing of steps S305 and onward is performed to commence moving image shooting. It is assumed that the processing for initiating moving image shooting described in steps S305 to S308 is first performed, and then followed by the processing for routine moving image shooting as illustrated in FIG. 4.

In step S305, the image processing circuit 20 performs predetermined metering computations for auto focusing (AF) on the signal obtained from the imaging device 14, and stores the computation results in the memory 30. Based on the computation results, the system control section 50 performs AF processing using the metering control section 42, and focuses the photographic lens 10 on the subject. In step S306, the image processing circuit 20 performs predetermined light metering computations on the signal obtained from the imaging device 14, and stores the computation results in the memory 30. Based on the computation results, the system control section 50 performs AE processing on the live view using the exposure control section 40.

In step S307, the image capturing apparatus 100 performs processing for moving image shooting, or in other words, a sequence of shooting operations (exposure processing and development processing). In step S308, the image captured in step S307 is displayed on the image display section 28 as a live view, thereby concluding the initiation processing for moving image shooting. Moving image shooting and recording (steps S403 to S407) continues until either the setting of the mode dial 60 is changed, or the moving image button 61 is pressed again.

FIG. 4 is a flowchart showing processing of routine moving image shooting.

In step S401, the process determines whether the mode has been changed by the mode dial 60. If so, the current moving image shooting is terminated and the process returns to step S203. If not, the process proceeds to step S402. In step S402, if it is determined that the moving image button has been pressed, the current moving image shooting is terminated and the process returns to step S203. If it is determined in step S402 that the moving image button 61 has not been pressed, the process proceeds to step S403 to continue moving image shooting.

In step S403, a sequence of shooting operations (exposure processing) is performed. The shooting operations store unprocessed pre-signal processing image data read out from the imaging device 14 via the A/D converter 16 to the memory 30. In step S404, the image processing circuit 20 performs predetermined light metering computations on the signal obtained from the imaging device 14, and stores the computation results in the memory 30. Based on the computation results, the system control section 50 performs AE processing using the exposure control section 40. AF processing such as described above may also be performed. In step S405, the image processing circuit 20 reads out image data stored in step S403 from the memory 30, and estimates light source type (color temperature) by performing a predetermined computation in order to determine a corresponding white balance control value. The obtained white balance control value is stored in the memory 30 as a moving image white balance control value.

In step S406, the image captured in step S403 is displayed on the image display section 28 as a live view. In step S407, development processing including color correction (white balance) using the moving image white balance control value determined as described above is performed on the image data stored in the memory 30. Predetermined compression processing such as JPEG is performed on image data obtained through the development processing, and the compressed image data is stored in the memory 30. The compressed image data stored in the memory 30 is then written onto the recording medium 200 as a moving image file.

In the present embodiment, as described above, when the shutter switches 62 and 64 are pressed during moving image shooting to issue an instruction to shoot still images, still image shooting during moving image shooting is initiated (hereinafter, the term "still image shooting" shall refer to shooting still images during moving image shooting). Therefore, step S408 determines whether the shutter switch 62 (SW1) has been pressed. If not, the process returns to step S401 to continue moving image shooting. If the shutter switch 62 (SW1) has been pressed in step S408, the process proceeds to step S409. In step S409, processing of still image shooting is performed. Processing of still image shooting performed in step S409 will be described later using FIG. 5. Once the sequence of still image shooting operations is completed, the process returns to step S401 to continue moving image shooting.

Figure 5:
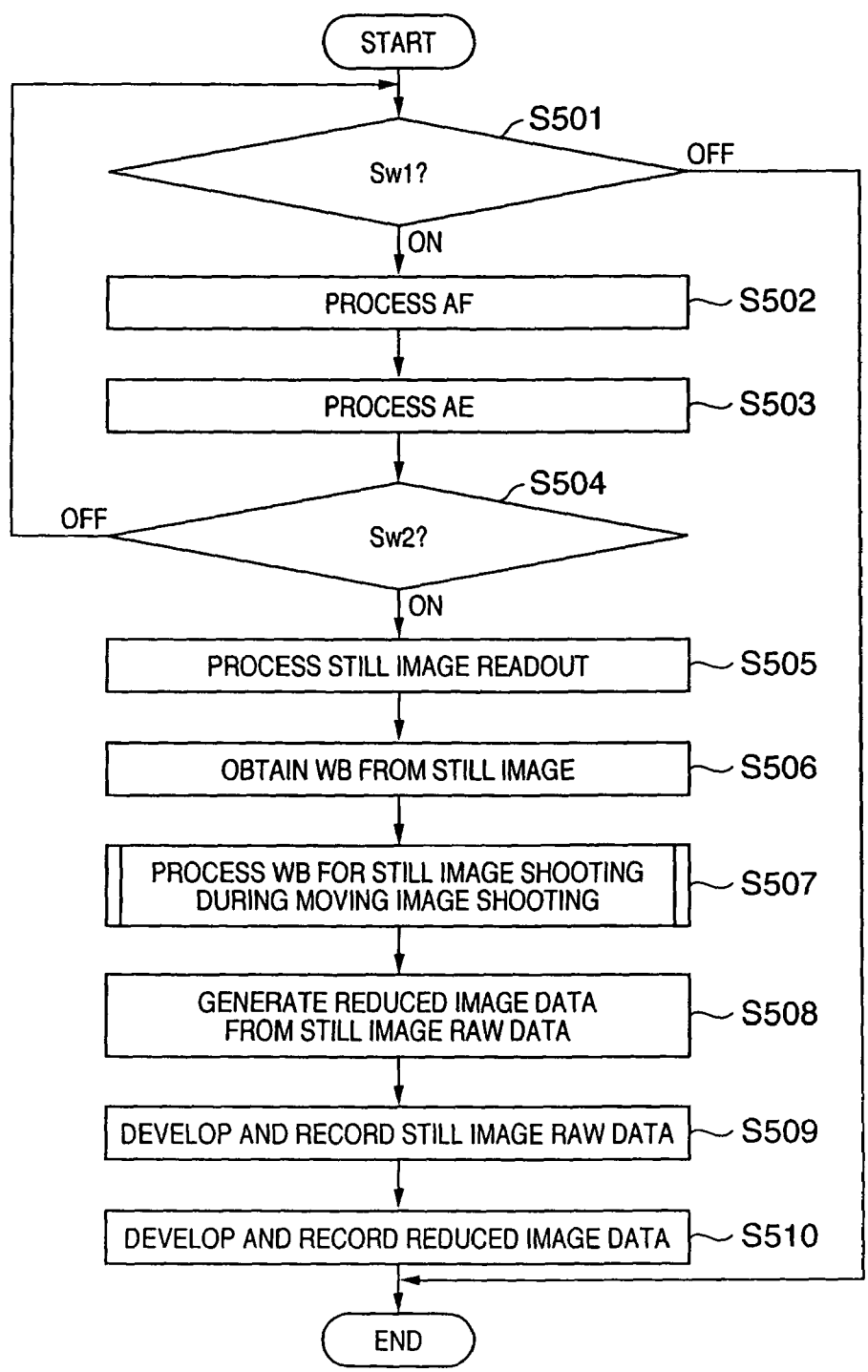
FIG. 5 is an explanatory flowchart of still image shooting processing during moving image shooting by the image capturing apparatus according to the present embodiment.

FIG. 5 is a flowchart illustrating the processing of still image shooting during moving image shooting performed in step S409.

In step S501, the process determines whether the shutter switch 62 (SW1) has been pressed. If not, the process is terminated to continue moving image shooting without commencing still image shooting. If it is determined in step S501 that the shutter switch 62 (SW1) has been pressed, the process proceeds to step S502. In steps S502 and S503, AF processing and AE processing are respectively performed in a similar fashion as in steps S305 and S306.

In step S504, the process determines whether the shutter switch 64 (SW2) has been pressed. If not, the process returns to step S501. If it is determined in step S504 that the shutter switch 64 (SW2) has been pressed, the process proceeds to step S505 to perform a sequence of shooting operations for shooting still images. After the shooting operations are performed, unprocessed pre-signal processing image data (still image raw data) read out from the imaging device 14 via the A/D converter 16 is stored in the memory 30.

In step S506, the image processing circuit 20 reads out the still image raw data from the memory 30, and computes a white balance control value based on the data. The white balance control data is then stored in memory 30. In step S507, white balance control values to be used for development processing of the still image raw data obtained in the current still image shooting, and a raw data of an alternate frame derived from the still image raw data (still image white balance control value and alternate frame white balance control value) are determined. Details of the determination process of these white balance control values will be described later using FIG. 6.

Next, in step S508, reduction processing is performed on the still image raw data stored in the memory 30 in step S505 to obtain a reduced image to be used as an alternate frame of the moving image frame dropped by the current still image shooting (alternate frame raw data). Incidentally, in order to obtain data that is close to the image data obtained during moving image shooting, the reduction processing emulates the drive mode for moving image shooting. For example, if field readout is performed during moving image shooting, a reduced image with conditions resembling field read out is obtained by using information resulting from adding data of each two pixels in a vertical direction.

In step S509, development processing including color correction (white balance) using the still image white balance control value determined in step S507 is performed on the still image data stored in the memory 30 in step S505. Then, predetermined compression processing such as JPEG is performed on image data obtained through the development processing, and the obtained compressed image data is stored in the memory 30 as a still image file.

In step S510, development processing including color correction (white balance) using the alternate frame white balance control value determined in step S507 is performed on the reduced image obtained in step S508. Then, predetermined compression processing such as JPEG is performed on image data obtained through the development processing, and the compressed image data is added as an alternate frame corresponding to the dropped frame to the moving image file being created in step S407.

Still image shooting during moving image shooting is hereby concluded.

Figure 6:
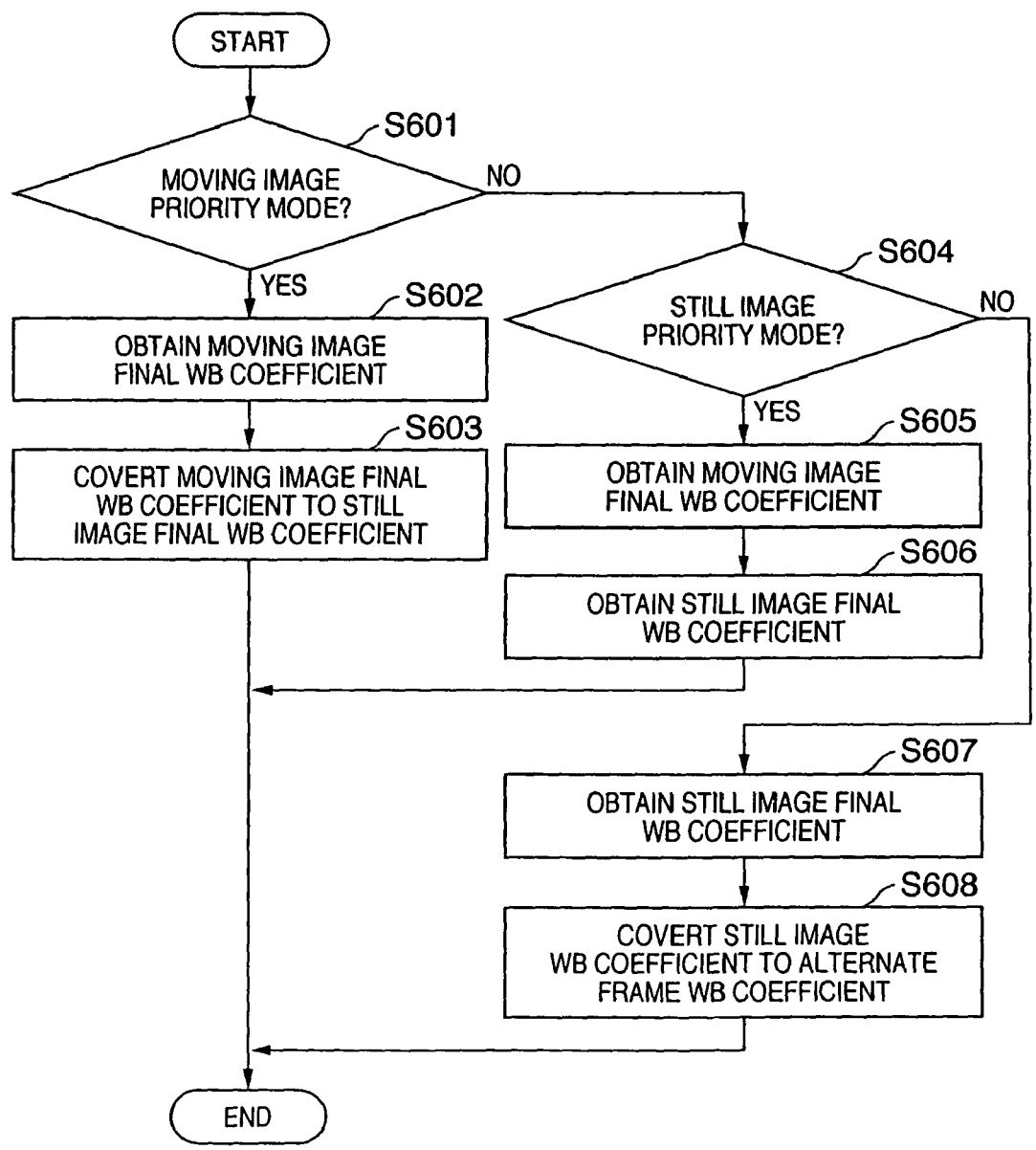
FIG. 6 is an explanatory flowchart of processing of white balance setting for still image shooting during moving image shooting by the image capturing apparatus according to the present embodiment.

FIG. 6 is a flowchart showing a setting processing for a white balance control value to be used for still image shooting. In this processing, a still image white balance control value to be used for developing still image raw data, and an alternate frame white balance control value to be used for developing reduced images are determined according to mode settings of the still image-during-moving image WB switching section 66.

In step S601, a white balance setting set by the still image-during-moving image WB switching section 66 for still image shooting during moving image shooting is referenced. If the setting is moving image priority mode, the process proceeds to step S602.

The moving image white balance control value obtained in step S405 is read out from the memory 30 in step S602, and is stored in the memory 30 as an alternate frame white balance control value. Next, in step S603, the moving image white balance control value read out in step S602 is converted into a still image white balance control value. This conversion is performed to cancel differences in spectral sensitivities caused by differences in drive modes of the imaging device 14 between moving image shooting and still image shooting. Details will be discussed later using FIG. 9. The converted white balance control value is stored in the memory 30 as a still image white balance control value.

In step S601, when the mode is not moving image priority mode, step S604 determines whether the mode setting set by the still image-during-moving image WB switching section 66 is still image priority mode. If so, the process proceeds to step S605.

In step S605, the moving image white balance control value is obtained from the memory 30 in the same way as in step S602, and is then stored in the memory 30 as an alternate frame white balance control value. Next, in step S606, the white balance control value obtained from the still image raw data in step S506 is read out from the memory 30, and is then stored in the memory 30 as a still image white balance control value.

In addition, when it is determined in step S604 that the setting of the still image-during-moving image WB switching section 66 is not still image priority mode, the mode is determined to be color reproducibility priority mode. The process then proceeds to step S607.

In step S607, the white balance control value obtained from the still image raw data in step S506 is read out from the memory 30, and is then stored in the memory 30 as a still image white balance control value. Next, in step S608, the still image white balance control value stored in the memory 30 in step S607 is converted into a moving image white balance control value, and is then stored into the memory 30 as an alternate frame white balance control value. This conversion processing has the reverse direction of the conversion processing of step S603. The conversion method will be discussed later using FIG. 9.

Thus, a still image white balance control value and an alternate frame white balance control value are obtained, thereby concluding the still image WB processing of step S507.

FIG. 7 shows for each mode the respective white balance control values set in the above described process, or in other words, set by the still image-during-moving image WB switching section 66. As explained earlier, the present embodiment allows three different settings: color reproducibility priority mode, moving image priority mode, and still image priority mode.

In color reproducibility priority mode, still images and alternate frames are obtained using a white balance control value obtained from raw data of still image shooting. Therefore, a high color reproducibility that reflects the light source condition at that point is achieved.

In moving image priority mode, a white balance control value conforming to moving image shooting is used for both still images and alternate frames. In other words, the light source condition at the time of still image shooting is not reflected. In this mode, colors during moving image shooting are applied to both alternate frame images and still images, and colors displayed on the viewfinder when performing still image shooting during moving image shooting can be applied to both moving and still images.

In still image priority mode, since a moving image white balance control value is used for alternate frame images, colors during moving image shooting are carried over and continuity of colors is maintain in moving images (the light source condition at the time of still image shooting is not reflected). On the other hand, a while balance control value obtained based on the still image raw data is used for still images. Therefore, the light source condition is reflected, allowing color reproducibility in still images. This mode enables still images taken during moving image shooting to track the subject light source while preserving color continuity of moving images during, before and after still image shooting during moving image shooting.

Figure 8:
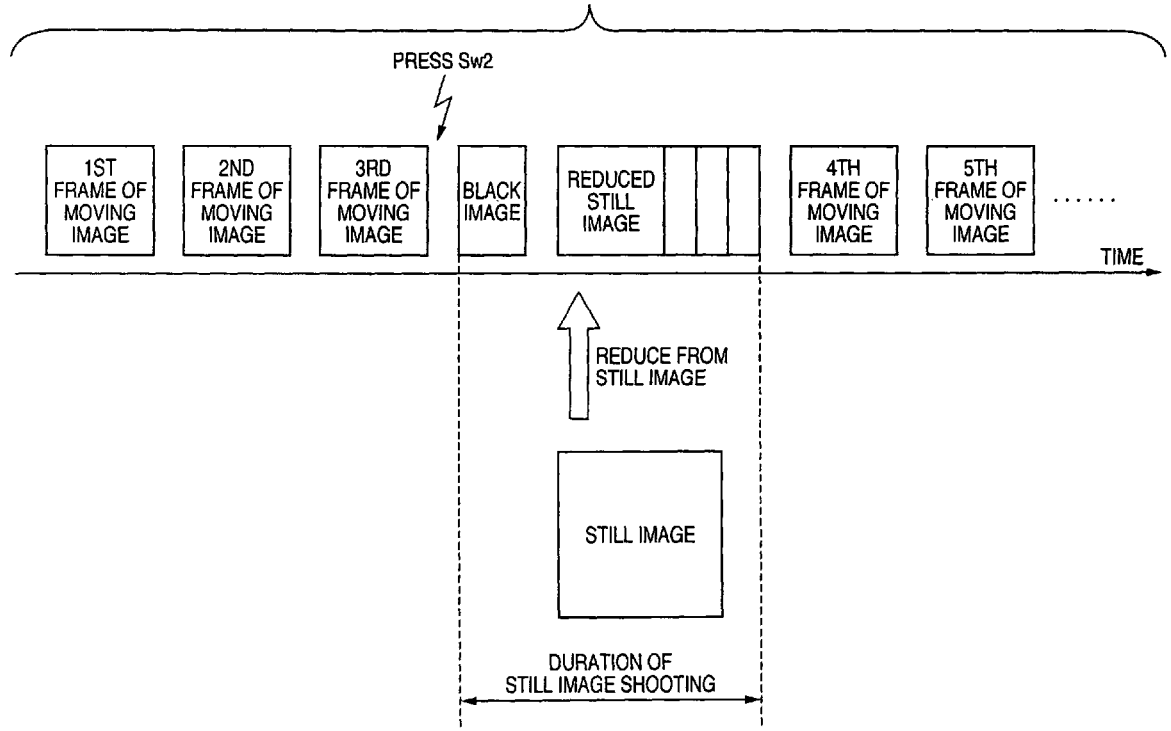
FIG. 8 is a timing chart of still image shooting during moving image shooting by the image capturing apparatus according to the present embodiment.

FIG. 8 is a timing chart illustrating a sequence in a temporal direction during still image shooting during moving image shooting.

When a signal of the shutter switch SW2 is inputted while moving image shooting is in progress, still image shooting is initiated. At this point, a reduced image of the obtained still image is used as an alternate frame of the moving image. The alternate frame is incorporated into the moving image file. Depending on the duration of the still image shooting, a plurality of alternate frames may be lined up. After the still image shooting during moving image shooting is concluded, moving image shooting is resumed. Incidentally, while FIG. 8 shows one frame's worth of black image inserted directly after the input of the SW2 signal, this may be omitted.

Figure 9:
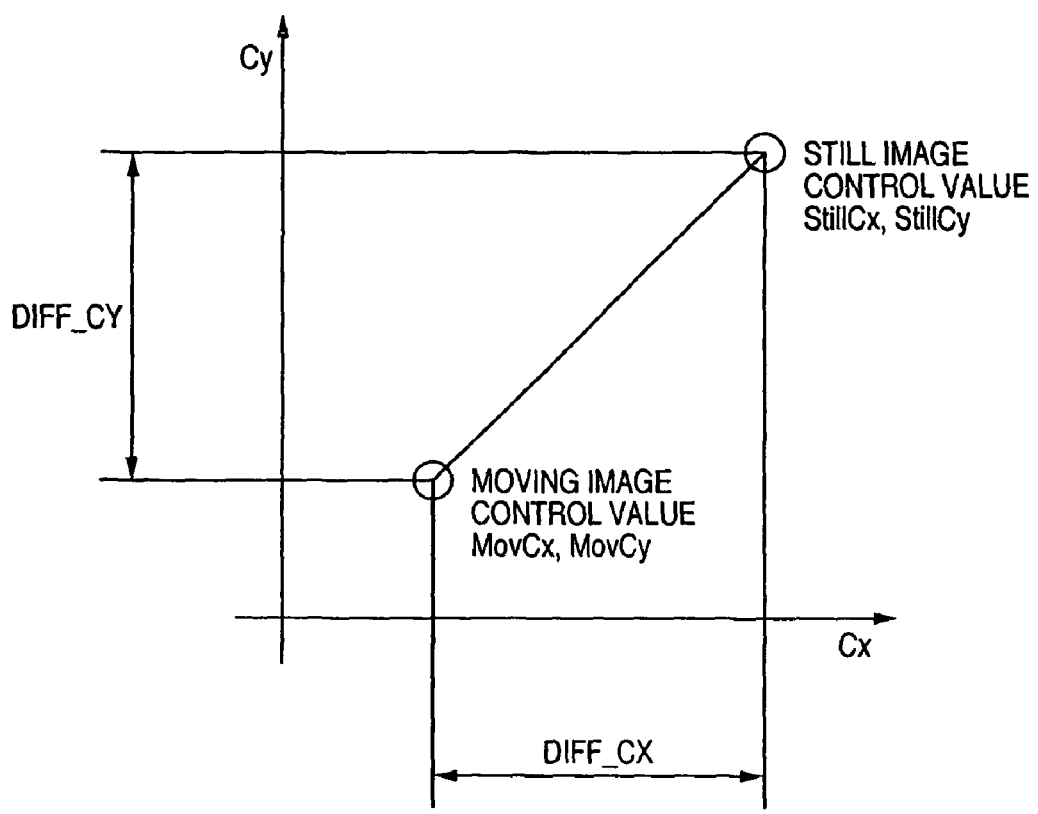
FIG. 9 is a diagram showing an example of compensation conversion depending on spectral sensitivity performed in white balance processing for still image shooting during moving image shooting by the image processing apparatus according to the present embodiment.

FIG. 9 is a diagram depicting an example of a method for mutually converting a moving image white balance control value and a still image white balance control value. In FIG. 9, the difference in spectral sensitivity caused by the difference between the CCD drive modes for moving images and for still images is indicated on a Cx, Cy coordinate of an XY chromaticity diagram. In other words, spectral sensitivities for each CCD drive mode are measured in advance and then presented on a Cx, Cy coordinate. DIFF_CX and DIFF_CY shown in the figure represent the differences in spectral sensitivity caused by the difference between the CCD drive modes.

For example, if a moving image white balance control value is expressed as MovCx, MovCy, a still image white balance control value StillCx, StillCy may be obtained by merely compensating the former by DIFF_CX, DIFF_CY. Reversely, it is also possible to convert a still image white balance control value to a moving image white balance control value. While a spectral sensitivity compensation expressed by a XY chromaticity diagram has been explained, other compensation unit such as multiplying color gains for each RGB color by a predetermined coefficient may be used. In addition, the conversion processing of steps S603 and S608 may be performed by referencing a maintained table of the correspondence between moving image white balance control values and still image white balance control values corresponding to each light source type (color temperature).

Figure 10:
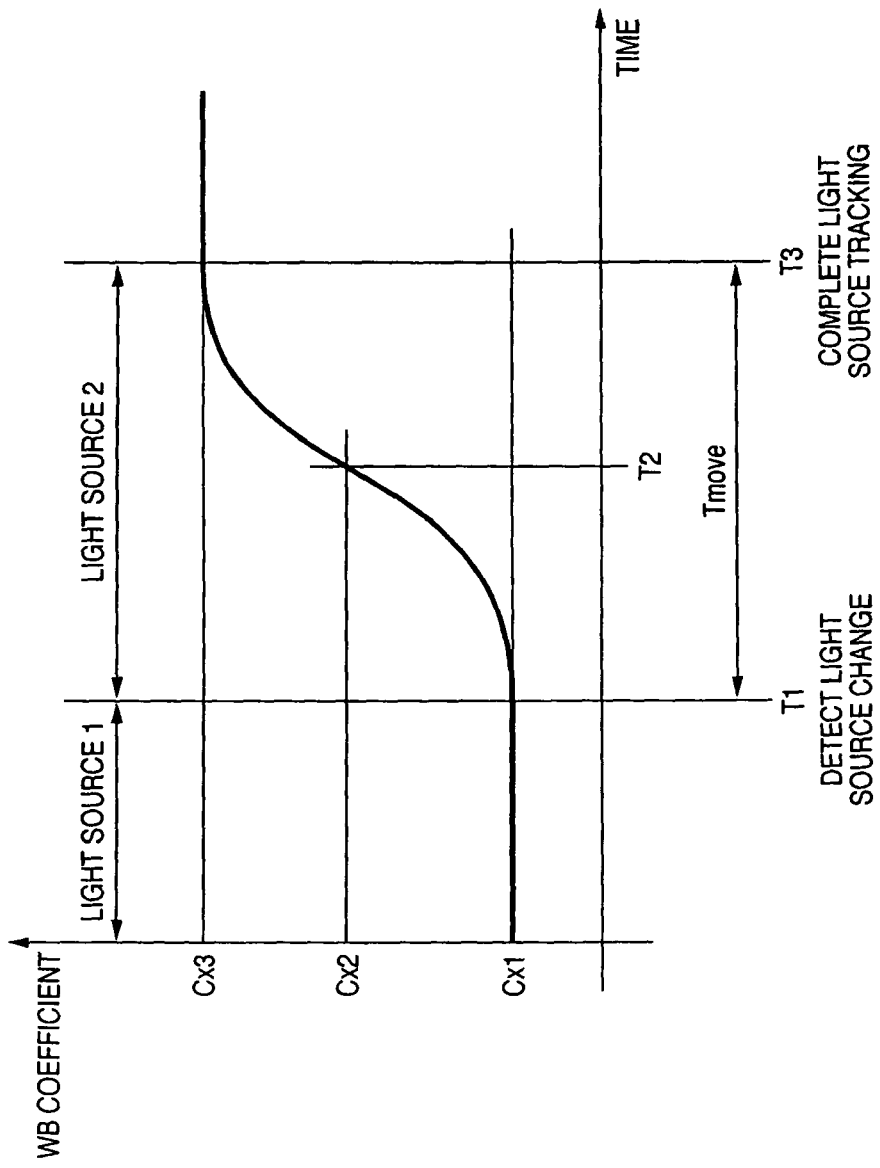
FIG. 10 is a diagram showing changes in the WB coefficient in a temporal direction when a change of the light source is detected when performing white balance processing for still image shooting during moving image shooting by the image processing apparatus according to the present embodiment.

FIG. 10 is a diagram showing how white balance control tracks changes in the subject light source during moving image shooting. The figure depicts temporal changes in white balance control values during moving image shooting when a shown light source 1 is switched to a shown light source 2 at time T1, where an appropriate white balance control value for the shown light source 1 is Cx1. In the present embodiment, when a switch from the light source 1 to the light source 2 is detected at time T1 in step S405 of FIG. 4, the white balance control value is gradually changed over time Tmove to a white balance control value Cx3 that is appropriate for the light source 2. In other words, the tracking from the light source 1 to the light source 2 is completed. Sudden changes in the white balance control value in response to detected changes in the light source will cause sudden changes in the colors of an image, and will result in a sense of discomfort. Time Tmove is set to prevent this from happening.

As shown in FIG. 10, since tracking is completed over a time Tmove after detection of the switching of light sources, there may be cases where a still image is taken while the tracking is in progress at a shown time T2. At this point, the Cx value during tracking is Cx2. In this case, for alternate frame images and still images during moving image priority mode, and alternate frame images during still image priority mode respectively described in FIG. 7 and the like, a value in the vicinity of the shown Cx2 (to be more precise, a white balance control value upon acquisition of the last image frame) is applied. In addition, even at time T2, for alternate frame images and still images during color reproducibility priority mode and still images during still image priority mode, a white balance control value tracking the light source at that point, or in other words, a white balance control value corresponding to Cx3 will be applied.

From this viewpoint, in color reproducibility priority mode, development processing is performed for both alternate frame images and still images using parameters tracking the light source at the time of still image shooting. In contrast, the light source tracking capabilities for still images during moving image priority mode, and for alternate frames during moving image priority mode or still image priority mode will be limited compared to that during color reproducibility priority mode (the light source condition during shooting of moving images is maintained).

Although the above embodiment has been configured to allow selection of a mode from the three modes shown in FIG. 7 (color reproducibility priority mode, moving image priority mode, still image priority mode), the image capturing apparatus may be adapted to comprise any one mode or a combination of any two modes. In addition, while a white balance control value has been indicated as a parameter for development processing, the parameter switching according to the present embodiment may be applied to parameters other than the white balance control value.

As explained above, the above embodiment allows white balance control values to be independently set for each alternate frame image and still image upon deriving alternate frames from still images when shooting still images during moving image shooting. Therefore, it becomes possible to: track subject light sources for still images (in still image priority mode); apply colors from directly before shooting still images during moving image shooting to both alternate frames and still images during moving image shooting (in moving image priority mode); and track subject light source with both moving images and still images during moving image shooting (in color reproducibility priority mode) without impairing the color continuity of moving images. In addition, compensation conversion is performed depending on the spectral sensitivity of the imaging device 14 on the white balance control values of still images and alternate frame images obtained from still image shooting during moving image shooting. Therefore, the effects due to the difference in drive modes of the imaging device 14 between moving image shooting and still image shooting may be desirably removed.

As many apparently widely different embodiments of the present invention can be made without departing from the spirit and scope thereof, it is to be understood that the invention is not limited to the specific embodiments thereof except as defined in the claims.

This application claims the benefit of Japanese Patent Application No. 2005-107746 filed on Apr. 4, 2005, which is hereby incorporated by reference herein in its entirety.

What is claimed is:

1. An image capturing apparatus capable of shooting still images during a moving image shooting, the apparatus comprising:
   a still image shooting unit adapted to perform a still image shooting to obtain a still image;
   a generating unit adapted to generate an alternate image corresponding to a period of the still image shooting performed by the still image shooting unit, wherein the alternate image includes at least one frame of a plurality of frames included in a moving image;
   a setting unit adapted to set respective white balance control values for the still image and the alternate image in accordance with a recording mode set by a user interface; and
   an image processing unit adapted to perform an image processing on the still image and the alternate image using the white balance control values set by the setting unit, wherein both the still image to be processed and the alternate image to be processed correspond to same still image data obtained by the still image shooting unit,
   wherein when the recording mode is set to a first moving image recording mode by the user interface, the setting unit sets a white balance control value for the moving image to both that for the alternate image and that for the moving image accepting the alternate image and when the recording mode is set to a second moving image recording mode by the user interface, the setting unit sets the white balance control value for the still image to that for the still image and uses the white balance control value for the still image to obtain a white balance control value for the alternate image.

2. The image capturing apparatus according to claim 1, further comprising:
   a maintaining unit adapted to maintain a conversion coefficient for converting the white balance control values so as to cancel a difference in spectral sensitivity characteristics caused by a difference in drive modes of the imaging device between the moving image shooting and the still image shooting;
   wherein the setting unit computes a white balance control value from the still image and sets the computed white balance control value as the white balance control value for the still image, converts the computed white balance control value using the conversion coefficient, and sets the converted white balance control value as the white balance control value for the alternate frame image.

3. The image capturing apparatus according to claim 1, further comprising:
   a maintaining unit adapted to maintain a conversion coefficient for converting the white balance control values so as to cancel a difference in spectral sensitivity characteristics caused by a difference in drive modes of the imaging device between the moving image shooting and the still image shooting;
   wherein the setting unit sets a white balance control value used until just before the still image shooting during the moving image shooting as the white balance control value for the alternate image, and sets a white balance control value obtained by converting the set white balance control value using the conversion coefficient as the white balance control value for the still image.

4. The image capturing apparatus according to claim 1, wherein the setting unit computes a white balance control value from the still image and sets the computed white balance control value as the white balance control value for the still image, and sets a white balance control value used until just before the still image shooting during the moving image shooting as the white balance control value for the alternate image.

5. The image capturing apparatus according to claim 1, wherein a number of pixels of the still image obtained by the still image shooting unit exceeds a number of pixels obtained by the moving image shooting.

6. The image capturing apparatus according to claim 1, wherein a method used by the imaging device for reading signals differs between the moving image shooting and the still image shooting.

7. A control method for an image capturing apparatus capable of shooting still images during a moving image shooting, the method comprising the steps of:
   shooting still images to obtain a still image;
   generating an alternate image corresponding to a period of the still image shooting performed by the shooting step, wherein the alternate image includes at least one frame of a plurality of frames included in a moving image;
   setting respective white balance control values for the still image and the alternate image in accordance with a recording mode set by a user interface; and
   performing an image processing on the still image and the alternate image using the white balance control values set by the setting step, wherein both the still image to be processed and the alternate image to be processed correspond to same still image data obtained at the shooting step,
   wherein when the recording mode is set to a first moving image recording mode by the user interface, the setting step sets a white balance control value for the moving image to both that for the alternate image and that for the moving image accepting the alternate image and when the recording mode is set to a second moving image recording mode by the user interface, the setting step sets the white balance control value for the still image to that for the still image and uses the white balance control for the still image to obtain a white balance control value for the alternate image.

8. An image capturing apparatus capable of shooting still images during a moving image shooting, the apparatus comprising:
   a still image shooting unit adapted to perform a still image shooting to obtain a still image;
   a setting unit adapted to set respective white balance control values for a still image and an alternate image in accordance with a recording mode set by a user interface; and
   a generating unit adapted to generate both a still image to be recorded and an alternate image corresponding to a period of the still image shooting performed by the still image shooting unit, wherein the alternate image includes at least one frame of a plurality of frames included in a moving image,
   wherein the still image to be recorded is generated by a white balance processing in accordance with the white balance control values set for the still image and the alternate image is generated by the white balance processing in accordance with the white balance control values set for the alternate image, wherein when the recording mode is set to a first moving image recording mode by the user interface, the setting unit sets a white balance control value for the moving image to both that for the alternate image and that for the moving image accepting the alternate image and when the recording mode is set to a second moving image recording mode by the user interface, the setting unit sets the white balance control value for the still image to that for the still image and uses the white balance control value for the still image to obtain a white balance control value for the alternate image.

9. The image capturing apparatus according to claim 8, wherein said setting unit sets the white balance control values for the still image and the alternate image in accordance with a difference in spectral sensitivity characteristics between the moving image shooting and the still image shooting.

10. The image capturing apparatus according to claim 9, further comprising a maintaining unit adapted to maintain a conversion coefficient for converting the white balance control values so as to cancel the difference in spectral sensitivity characteristics caused by a difference in drive modes of the imaging device between the moving image shooting and the still image shooting, wherein said setting unit computes a white balance control value from the still image and sets the computed white balance control value as the white balance control value for the still image, converts the computed white balance control value using the conversion coefficient, and sets the converted white balance control value as the white balance control value for the alternate frame image.

11. The image capturing apparatus according to claim 8, further comprising a maintaining unit adapted to maintain a conversion coefficient for converting the white balance control values so as to cancel the difference in spectral sensitivity characteristics caused by a difference in drive modes of the imaging device between the moving image shooting and the still image shooting, wherein said setting unit sets a white balance control value used until just before the still image shooting during the moving image shooting as the white balance control value for the alternate image, sets a white balance control value obtained by converting the set white balance control value using the conversion coefficient as the white balance control value for the still image.

12. The image capturing apparatus according to claim 8, wherein said setting unit computes a white balance control value from the still image, sets the computed white balance control value as the white balance control value for the still image, and sets a white balance control value used until just before the still image shooting during the moving image shooting as the white balance control value for the alternate image.

13. The image capturing apparatus according to claim 8, wherein a number of pixels of the still image obtained by the still image shooting unit exceeds a number of pixels obtained by the moving image shooting.

14. The image capturing apparatus according to claim 8, further comprising a recording control unit adapted to control recording of the still image to be recorded as a still image file and recording of the alternate image as a part of a moving image file.

15. A control method for an image capturing apparatus capable of shooting still images during a moving image shooting, the apparatus comprising the step of:

shooting still images to obtain a still image in accordance with a processing mode set by a user interface;

setting respective white balance control values for the still image and an alternate image; and generating both a still image to be recorded and an alternate image corresponding to a period of the still image shooting performed by the shooting step, wherein the alternate image includes at least one frame of a plurality of frames included in a moving image, wherein the still image to be recorded is generated by a white balance processing in accordance with the white balance control values for the still image and the alternate image is generated by the white balance processing in accordance with the white balance control values for the alternate image, wherein when the recording mode is set to a first moving image recording mode by the user interface, the setting step sets a white balance control value for the moving image to both that for the alternate image and that for the moving image accepting the alternate image and when the recording mode is set to a second moving image recording mode by the user interface, the setting step sets the white balance control value for the still image to the moving image excepting the alternate image with that for the still image and uses the white balance control value for the still image to obtain a white balance control value for the alternate image.

* * * * *